(12) United States Patent
Shmul

(10) Patent No.: US 8,381,167 B2
(45) Date of Patent: Feb. 19, 2013

(54) BUSINESS SERVICE DISCOVERY

(75) Inventor: Emil Shmul, Yehud (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 1058 days.

(21) Appl. No.: 12/320,587

(22) Filed: Jan. 29, 2009

(65) Prior Publication Data

US 2010/0191555 A1 Jul. 29, 2010

(51) Int. Cl.
*G06Q 10/00* (2012.01)
*G06T 11/20* (2006.01)

(52) U.S. Cl. ............ 717/100; 705/7; 705/343; 705/348; 345/440; 707/602; 707/603; 707/706; 707/712

(58) Field of Classification Search .............. 705/7, 343, 705/348; 345/440; 717/100; 707/1, 602, 707/603, 705, 712
See application file for complete search history.

(56) References Cited

U.S. PATENT DOCUMENTS

| | | | | |
|---|---|---|---|---|
| 6,601,233 | B1 * | 7/2003 | Underwood | 717/102 |
| 6,718,535 | B1 * | 4/2004 | Underwood | 717/101 |
| 8,069,435 | B1 * | 11/2011 | Lai | 717/106 |
| 2004/0015408 | A1 * | 1/2004 | Rauen et al. | 705/26 |
| 2005/0044197 | A1 * | 2/2005 | Lai | 709/223 |
| 2009/0089072 | A1 * | 4/2009 | Gupta et al. | 705/1 |
| 2009/0254422 | A1 * | 10/2009 | Jenkins et al. | 705/11 |

* cited by examiner

*Primary Examiner* — Chat Do
*Assistant Examiner* — Lynda Dinh

(57) ABSTRACT

A business service discovery (BSD) system, implemented as programming on a processor, provides for discovering, formatting, and storing configuration information related to a business service. The BSD system uses a discovery engine to create a search methodology used for discovering the configuration information. The discovery engine controls a number of discovery components, each of which includes a definition of a corresponding BSD class model. The BSD system further includes a universal configuration management database (uCMDB) graph engine that creates a uCMDB graph representing a system discovered by the discovery component, and an input module that receives hints and conditions related to one or more elements of the business service, wherein a completed discovery search produces a business service structure.

18 Claims, 5 Drawing Sheets

BUSINESS SERVICE DISCOVERY

BACKGROUND

Current information technology (IT) environments employ a variety of IT management tools. One such tool is used to "discover" certain business-related aspects of an organizations business systems and processes, and then use this discovered information for purposes such as improving the organization's efficiency. Improving the discovery process will help the organization achieve its goals.

DESCRIPTION OF THE DRAWINGS

The detailed description will refer to the following drawings in which like numerals refer to like items, and in which.

DETAILED DESCRIPTION

Figure 1:
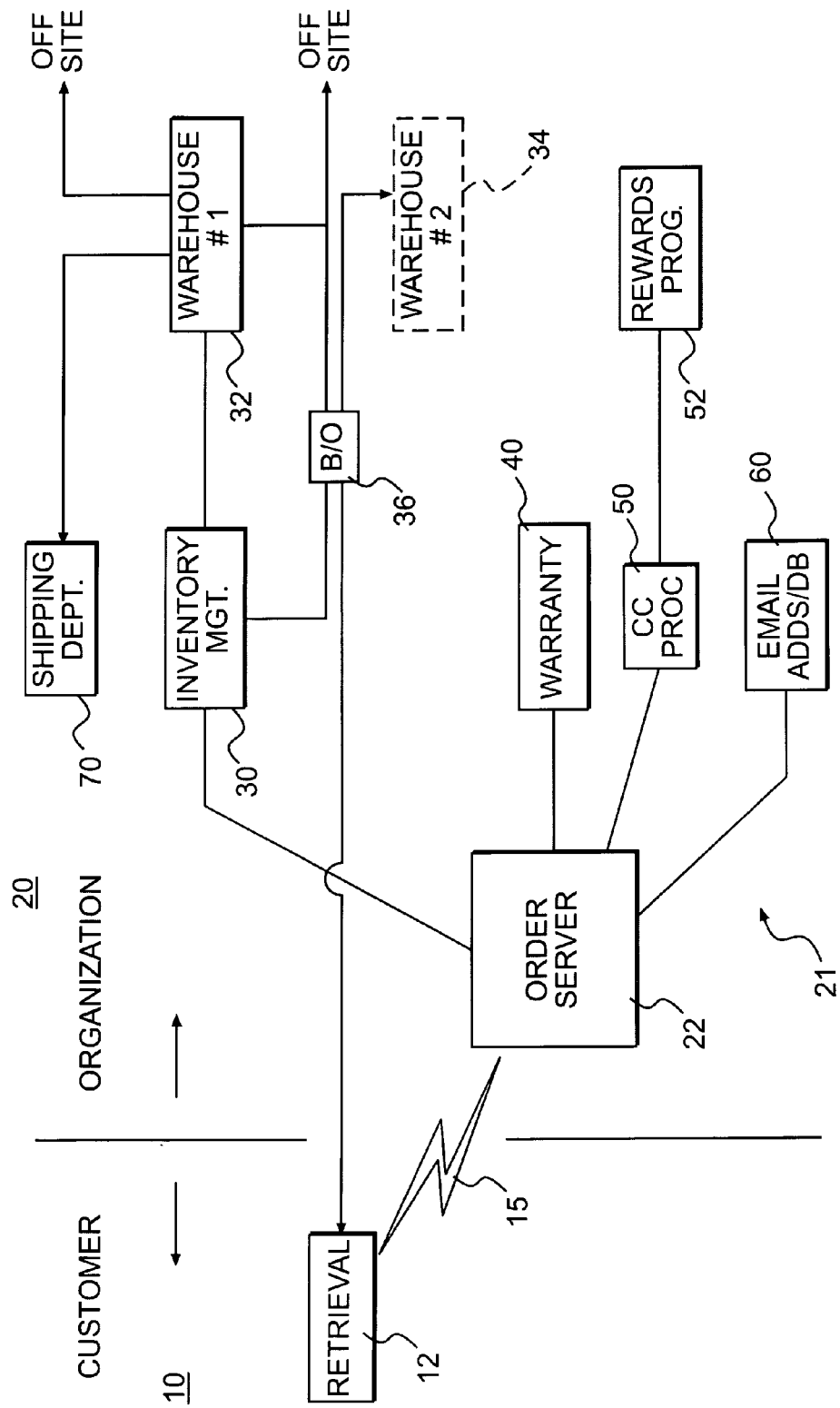
FIG. 1 shows selected components of an exemplary business service.

Described herein is a business service discovery (BSD) system, implemented as programming on a processor, for discovering, formatting, and storing configuration information related to a business service. The BSD system uses a discovery engine to create a search methodology used for discovering the configuration information, The discovery engine controls a number of discovery components, each of which includes a definition of a corresponding BSD class model. The BSD system further includes a universal configuration management database (uCMDB) graph engine that creates a uCMDB graph representing a system discovered by the discovery component, and an input module that receives hints and conditions related to one or more elements of the business service, wherein a completed discovery search produces a business service structure.

Also described herein is a method, implemented on a processor, for discovering and storing a business service structure, comprising the steps of receiving hints or conditions for one or more elements of the business service structure; using the received hints or conditions, determining an element of the business service structure that is most explicitly defined; selecting a search component appropriate for the most explicitly defined element and dispatching the search component to discover the element, wherein discovering the element comprises: applying an application signature definition to the element, determining if the IP hosts the element, determining links from the element to adjacent elements, and generating a graph of the element; selecting an adjacent element and repeating the discovery process on the adjacent element; and continuing the adjacent element selection and discovery until all elements are discovered, wherein a graph of the business service structure is created.

An organization's business services can be thought of as the nervous system of the organization. A business service describes what is delivered by a business, organization, company, enterprise, or system. A business service might not necessarily be "performed" or "executed," but may, nonetheless, have measurable performance parameters and may use actual physical elements ("managed objects") that can be monitored. A business service may directly support the ongoing operations of the organization or the products and services that customers consume from the organization. Business services usually have a measurable value to their consumers.

A business service is made of a set of steps, tasks, or activities that may encompass many of the organization's resources and which allow the organization to produce a service or a product in a structured and managed way. Business services might include a long chain of departments and units of a company or even of few companies. Business services are dynamic and agile and are subject to constant change since organizations seek to tune and optimize the structure of their business services for better alignment with their ever changing business environment. Very optimized and tuned business services allow the organization to compete more efficiently and to deliver services and products faster then competitors.

Each business service may be supported by an information technology (IT) infrastructure. Whenever the business service is changed because of business requirements, its infrastructure may also need to change to support the new structure of the business service.

Usually, organizations design their business services through (EA) Enterprise Architecture management tools. The structures or the models of the business services, and their relationships with the IT infrastructure, are usually stored in the repositories of these tools. An example of such a repository is a configuration management database (CMDB). The herein disclosed business service discovery mechanism can access these structures in order to give the organization the ability to initiate the discovery of these structures easily and frequently after each change in the business service.

In the context of IT management, a "managed-object" may be any computing object, at any layer, and in any level, that composes the organization's computing landscape. That includes any software, firmware or hardware components. Examples of the introduction or modification of a managed-object include such activities as the addition of a computer, device or printers to a network (in which case the device can be related as a managed-object, and any software or hardware components on it can be related as managed-objects), the installation of new software to a computer on the network, or the reconfiguration of an existing application on a computer on the network.

Anything added or modified within the computer (for instance) on the network, from the hardware layer through the operating system layer to the application layer, could be considered a managed-object, if required to be managed. This applies for systems including servers, storage, wired networks, mobile networks, small form factor devices, and other computing systems.

Any large, modern organization may use different systems to provide the organization's mission critical business services. This diversity of systems results from many factors including lack of coordination among an organization's operating units, different rates of adopting new technology, mergers and acquisitions, and geographic separation of the organization's operating units.

Consider the example of a merger of two organizations to form a new organization. The new organization inherits the data stores of the original organizations. Those data stores may operate under control of different relational database management systems. After the merger, the new organization needs to be able to access the customer information from both sets of data stores, to analyze its new portfolio using existing and new applications, and, in general, to use the combined resources of both organizations through a common interface. The new organization also needs to be able to identify common customers and consolidate their accounts, even though the customer data may be stored in different databases and in different formats. In addition, the new organization may need to be able to combine the legacy data with new data available from external data sources, such as data on the Internet or from its business partners. Integrating these diverse data sources poses a substantial challenge.

Automatic or semi-automatic discovery processes are used to enable a network to discover any computing object on the network as that object joins the network or changes its state (for example going online or offline), and the recognition of any relevant data regarding that object (such as the object's metadata), including the object's functionality, characteristics, attributes and it's linkage to other objects. Discovery processes may also enable discovery of the topological properties of a network at any time, and for any reason, such as may be desired to implement improvements to the organization's operations.

In fact, discovery is a fundamental capability for business service management. In one aspect, discovery preferably occurs in real-time so the right decisions and actions can be made at the IT services level.

Today, a user who is interested in discovering a mission critical business service, using current discovery engines, may do the following: (1) draw the structure of the mission critical service in terms of the class model of the uCMDB (such as a universal CMDB); and (2) breakdown the structure of the mission critical service into a set of very fine grained trigger queries, such as topological query language (TQL) queries, which are defined by the discovery patterns of current discovery engines.

This process of modeling and decomposition is often very time-consuming and unintuitive and requires a thorough knowledge and understanding of the uCMDB class model and an intimate knowledge of the discovery patterns and each pattern's input TQL.

Because of the difficulty in implementing a discovery process with current discovery engines, most users, in order to discover mission critical services and populate their CIs in the uCMDB, tend to discover very wide areas of the business and IT infrastructure, and as a result the organization's uCMDB is often populated with many CIs that are not part of the organization's business services.

Disclosed herein is a business service discovery system and a corresponding method. The description that follows refers to specific implementations of the business service discovery system and method, including the use of a configuration management database (CMDB) or universal CMDB (uCMDB) in which is stored configuration information related to the business service. However, those skilled in the art will appreciate that the discovery system may be implemented using any suitable database type and also may be used for many other purposes besides configuration management.

In the context of the herein disclosed business service discovery system, the term configuration management will be used to refer to the process responsible for maintaining information about configuration items (CIs) required to deliver a business service, including the relationships among the CIs. One objective of configuration management is to underpin the delivery of business services by providing accurate data to all business service management processes when and where needed.

Configuration management manages information about configuration items throughout the lifecycle of a CI. A CI may be any component that needs to be managed in order to deliver an IT Service. CIs may for instance be hardware elements, software, buildings, people, and even elements of formal documentation such as process documentation and service level agreements (SLAs). For example, a bond trading service may have multiple application and Web servers, several databases, Linux, UNIX, and Windows servers. There will be security products, network storage, disaster recovery procedures and hardware that are necessary for the bond trading service to operate properly.

In addition to the hardware, software, network, database, and storage areas, it is beneficial to know which individuals or groups are responsible for the service from both a business perspective as well as an IT perspective. Who are the Line of Business users/managers? Who starts and stops the application or its components? Who monitors the log files? Who is in charge of backup and restore, business continuity, and disaster recovery?

Information about each CI can be recorded in a configuration record within a CMDB. Each configuration record may document the lifecycle of a single CI. Each CI may be classified using some common attributes that describe a "class." The way in which CIs, and their relationships, interact can be modeled using "object-oriented modeling, which in some respects is analogous to object-oriented programming. Furthermore, the CIs and their relationships may be displayed as a graph (e.g., a CMDB graph, or similar construct), which helps human comprehension of the related business service.

A CMDB is a database used to manage configuration records throughout the lifecycle of the CI associated with the configuration record. The CMDB records the attributes of each CI, and relationships with other CIs. A CMDB may also contain other information linked to CIs, for example incident, problem or change records. The CMDB is maintained by the process of configuration management and may be used by all IT service management processes.

In describing the exemplary business service discovery system, the following terms will be used:

A data store is any data storage system, including a CMDB, a uCMDB, or other database, where CIs and their relationships are recorded.

An external CI is a configuration item that does not originate from the CMDB system. That is, the external CI is a class defined in the CMDB class model, whose specific instances are stored in external data stores and not in the CMDB.

Topology refers to the topological state (i.e., relationships or links) between objects. Objects also may have a non-topological state; that is, the attributes and behaviors over time. Relationships in topology are binary in nature. That is, each relationship links exactly two topologically managed objects. Relationships of degree n are modeled by representing the relationships themselves as topologically managed objects, until a binary model is built to describe the degree n relationships. Using this approach, individual objects that are part of a larger resource can be aggregated. An aggregated object assumes the topological states of the individual objects that comprise the aggregated object.

Topology query language (TQL) refers to an object-oriented framework for describing applications and business services, and includes both physical and logical objects, their attributes, and their relationships to one another. TQL enables the creation of graphical views designed to capture relevant interdependencies (i.e., relationships) of items (including CIs) across IT services, applications and infrastructure groups. Federated TQL (FTQL) is the term used to refer to a TQL that includes external CIs in its definition.

A CMDB common data model (CDM) unifies the representation of configuration data. The CDM is designed to store data (such as hardware information, service management information, people information), and provide a mechanism for linking that information to provide a complete view of how all elements of a company are tied together and affect each other. The CDM uses an object framework API to define the data model. The following table defines some commonly used terms needed to understand the CDM.

TABLE

Common Data Model

| Term | Description |
| --- | --- |
| Class | For example, a data storage element. In database terms class relates to a table in the database. For example, the Computer System class in the CDM is a class that stores information about computer systems. |
| Attribute | Attributes are found within a class. An attribute is related to a column in a table or a field on a form in AR System terms. For example, the Computer System class has attributes that track the name, manufacturer, model, and so on, of the computer system. |
| Subclass | A subclass extends the definition of a class. For example, some features are included in the whole class, but there might be extra features (subclasses) that are added to the basic feature list. For example, the Computer System class includes subclass MainFrame. The Mainframe subclass contains all of the attributes of the Computer System class, plus attributes that are specific to mainframes. |
| Relationship | Relationships are ways to tie two instances of data or configurable items together. |

FIG. 1 illustrates an exemplary business service that allows a customer 10 to place orders with an organization 20 using the organization's network 21. The network 21 includes software, hardware devices (CIs), and physical structures (e.g., warehouses 32 and 34). Here the business service is providing for order receipt, processing, and fulfillment, and is made possible by the combination of nodes (modules) of the network 21, and their relationships and interactions. The customer 10 uses terminal 12 to place orders, and the orders are communicated to an order server 22 over the Internet 15. The order server 22, as an object (or CI) in the organization's network 21, provides the programming and displays to allow the customer 10 to enter data related to a desired product or service. Communications between the order server 22 and the terminal 12 occur according to one or more well-established protocol, including TCP-IP. The order server 22 then communicates with a variety of "modules" within the organization's network 21, including an inventory management module 30, warranty module 40, payment (credit card) processing module 50, database storage module 60, and shipping department module 70. One or more of the modules 30, 40, 50, 60, and 70 may have been added to an original version of the network 21. Alternatively, functions of one or more of these modules may have changed over time and/or new functions (e.g., back order system 26, rewards program 52) may have been added to the business service. Still further, external forces (e.g., privacy regulations) may have required changes to the operation of one or more of these modules. In addition, communications protocols between the modules may have changed over time, and additional facilities may have been added (e.g., warehouse 34). The end result could be that operation of the network 21 in its current configuration may differ from that of an earlier version of the network.

Should the organization 20 desire to implement new processes in one or more modules, perhaps to comply with new government regulations, to conform to new communications protocols, or to improve the efficiency of operation of the network 21, the organization's IT department will necessarily have to know the "configuration" of the network 21 including, for example, its topology. However, such configuration information may not be available, or may be out-of-date and incorrect. even when the configuration information is known, available, and accurate, such information may lack the specificity and detail needed to allow the organization's management to fully understand the business service structures that allow the organization to provide the corresponding business service. Accordingly, the organization may need to invoke a discovery process to establish the configuration of the network 21. Described below is an exemplary business service discovery system 100 and a corresponding exemplary method 400, that can be used for this purpose.

Figure 2:
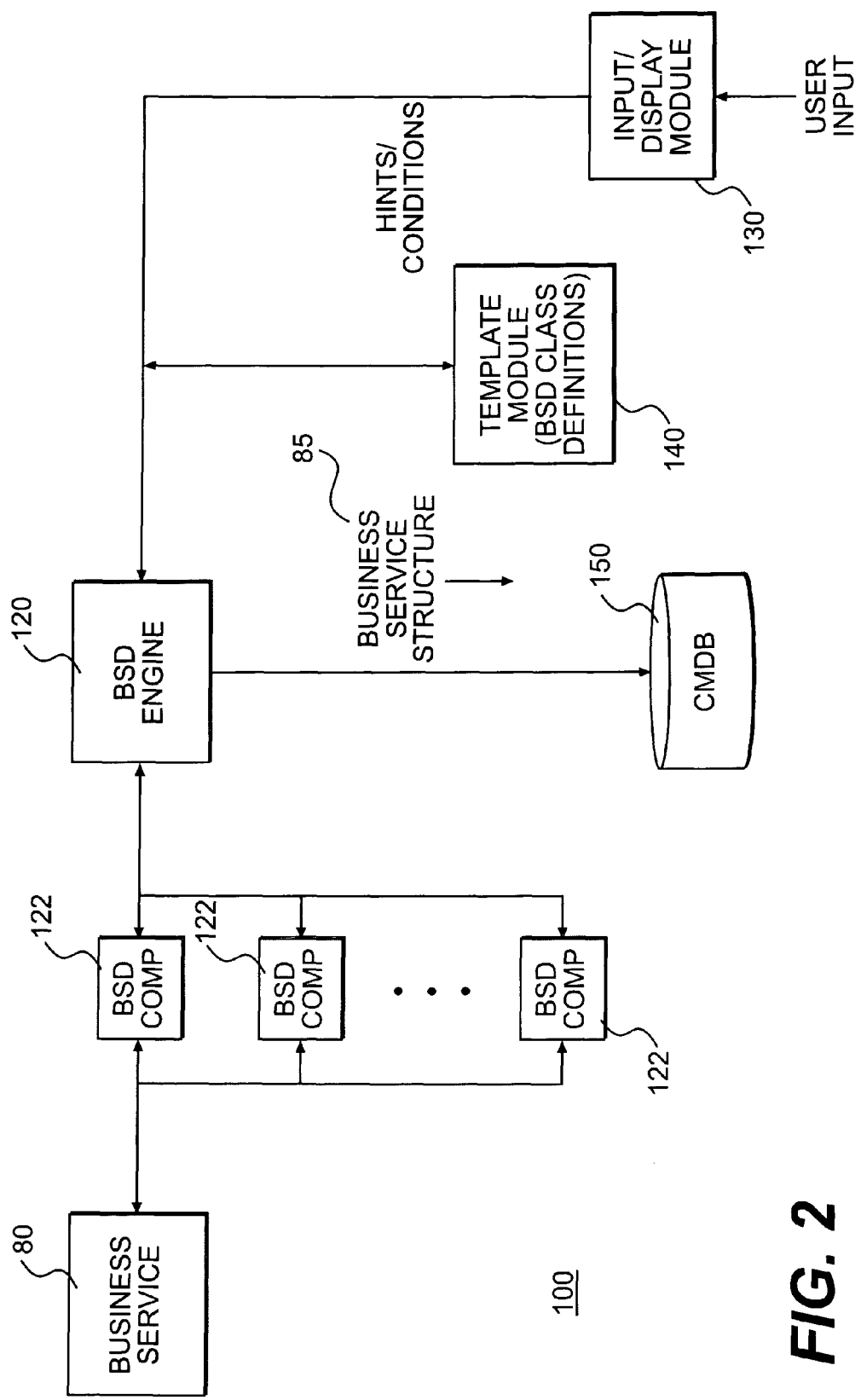
FIG. 2 shows selected components of an exemplary business service discovery system.

FIG. 2 illustrates selected components of the exemplary business service discovery system 100. The system 100 includes probe module 110, which receives inputs from input module 130, compares the inputs to templates stored in the template module 140, and based on the comparison, directs discovery engine 120 to "discover" the business service structure (e.g., topology) 85 of business service 80, where the business service 80 comprises a series of nodes, each of the nodes defined by one or more conditions or attributes, such as the communications protocol used at that node, the operating system invoked at that node, and the classes (concrete and abstract) that are relevant to that node. The nodes may exist for a host, an application server, a Web server, and a database, for example. The business service structure 85 is stored as a graph or similar or other data structure in a database, which, in an embodiment is configuration management database (CMDB) 150.

To begin the discovery process executed by the discovery engine 120, the probe module 110 first receives one or more "hints" or conditions as to the features of one or more of the nodes. The hints may be supplied by a human user by way of the input module 130. With such hints, the discovery engine dispatches one or more discovery agents 122 to ascertain the "configuration" of its associated objects. The process for determining this configuration will be described later in more detail. The result of this discovery process will be a data structure that represents the business service, and which can be stored in the CMDB 150 and can be displayed as a CMDB graph to a user.

Figure 3:
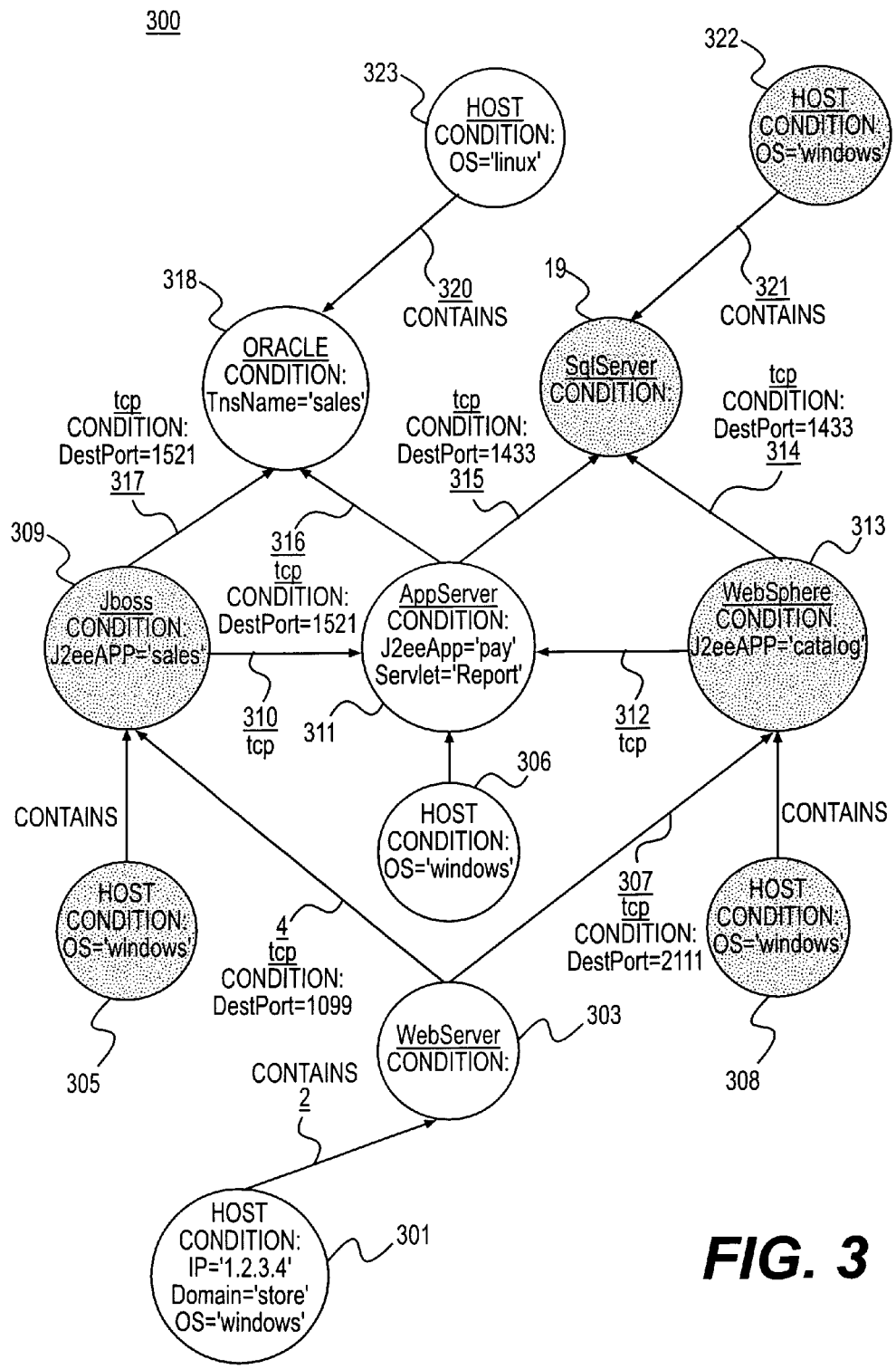
FIG. 3 shows an exemplary business service structure created using the system of FIG. 2.

FIG. 3 illustrates a representative data structure 300 created using the system of FIG. 2. In order to construct the correct view of the data structure 300, the human user attaches hints or conditions to as many of the known nodes of the business service associated with the structure 300. Consider node 311, for an application server. The node 311 is shown to have attached as hints, a J2EE application named "pay" and a servlet named "report." The hints and conditions also can include the communications protocols used on the links between nodes. For example, all the nodes shown in FIG. 3 use a TCP protocol. The links also might include a hint or condition regarding the destination port number of the TCP connection, such as shown for link 315 (i.e., port 1433).

Using the definitions of the links, the discovery engine 120 is able to interrogate each node of the business service in succession. Each discovered link attached to a currently interrogated node might lead to a system that is compatible with an adjacent node.

In executing its discovery functions, the discovery engine 120 differs in structure and operation from current discovery mechanisms. Specifically, business service discovery (hereafter, BSD) classes are very coarse-grained to include information regarding a system such as an application server or a database. However in the CMDB class model, each such system in the business service structure is represented by a very detailed topology that includes several CIs of objects and links. Thus, although each BSD class represents the CMDB graph of its system and reveals attributes that maintain information regarding that system, the BSD class is not required to reveal all the attributes of the CIs of its represented CMDB graph, but instead only the most important attributes, as defined by a domain expert. Note that in the BSD class model, some attributes may be compound attribute types, such as set, list, and map. Accordingly, the discovery engine is designed to discover these coarse-grained elements for the systems to which the BSD class pertains, rather than the more complex discovery functions required of other discovery mechanisms. One aspect of this structural change between the discovery engine 120 and current discovery mechanisms are coarse-grained discovery agents, such as the discovery components 122. the advantages of such coarse-grained discovery, and additional structural and functional aspects, are described below.

The business service model is invoked with BSD classes that are coarse-grained because such coarse-grained classes will be simpler and easier to use than conventional configuration (e.g., CMDB) classes. First, the CMDB native class model is very detailed—to the point of being overwhelming for most users, making it very difficult for a user to model business services using the CMDB native class model. As an example, consider the case where a user wants to model an application server connected to a database. According to the CMDB native class model, this connection passes through a "JDBC Data-Source", an entity which probably is meaningless to most users. Furthermore, the internal topology of an application server (which is very detailed and made up of many CIs) is only familiar to very skilled administrators and developers and probably not to the typical user. Second, it would be difficult to build a business service discovery engine that is based on the existing discovery patterns and on the CMDB native class model since such a discovery engine would have to invoke, iteratively, the next appropriate discovery pattern to discover the next uncovered system, node, or area (or sub-graph) of the business service. Such a business service discovery engine also would have to match the discovery-pattern returned sub-graph with a corresponding sub-graph in the business service definition graph. These sub-graph comparisons and matching would increase the complexity of the business service discovery engine.

The BSD class model allows for inheritance relationships between BSD classes. These inheritance relationships permit users to invoke more specific or more general classes, according to the user's knowledge of the business services' systems. For example, consider the business service 300 of FIG. 3, some of whose classes represent specific systems that can be matched to a specific application signatures e.g., Jboss, Oracle, SqlServer. Some other classes represent more general types of systems e.g., AppServer and Windows. General class or abstract class is used whenever the user does not have the specific information regarding a system of the business service. For example, the super class database may be invoked when the user does not know more specific information about the database actually used by the business system. Usually, each general/abstract class is associated with few application signatures, for example: "AppServer" is associated with Jboss, WebSphere and WebLogic application signatures, and thus use of a more abstract class is possible with the discovery engine 120 of FIG. 2.

As noted with respect to FIG. 2, a BSD component 122 is activated by the BSD engine 120 to perform the actual discovery of a system within the business service structure. Each BSD class has a matching BSD component 122. This BSD component 122 is constructed internally within the discovery system 100 based on all the necessary existing discovery patterns and protocols (i.e., the templates in template module 140) that are required to discover a particular system represented by the BSD class. Thus, each BSD component 122 includes a definition of its corresponding BSD class model. Each BSD component 122 also includes an application signature definition, and a graph engine. The application signature definition is used to discover specific instances of applications of the BSD class, and the graph engine is used to create a graph of the discovered system. In an embodiment, the graph engine may create a CMDB graph or a uCMDB graph of the system. The BSD component 122 hides the details of which discovery patterns and which protocols are used to discover the system from the BSD engine 120. Immediately after its activation, a BSD component 122 uses an application signature definition to check whether the interrogated IP hosts the appropriate system. In cases where the IP does not host the system, the BSD component 122 finishes its discovery operation. In cases where the IP does host the system, the BSD component 122 continues with more thorough discovery of the system. BSD components 122 that represent abstract BSD classes (e.g., AppServer) may try first to discover which of the specific application signatures is matched with the interrogated system. Using feedback from the BSD component 122, the BSD engine 120 then can activate a more specific BSD component 122, if appropriate.

After the BSD engine 120 activates a BSD component 122, the BSD component 122 proceeds with discovering the system and returning an instance of that system's matching BSD class. Some of the attributes of a BSD class might be compound attributes like list or set. For example: an "Application Server" BSD class might expose the following attributes:

Version: String
J2eeApplications: list<String>
J2eeModules: list<String>
Servlets: list<String>
Ejbs: list<String>

The above example is a very flat representation and does not model any relationships between elements like: J2eeApplication→J2eeModule→Ejb (containment relationship). However, this flat representation is more than enough to allow the user to express hints (conditions) that will be attached to each of the systems that undergird the business service. This representation also allows the user to define hints and conditions that are specific enough to allow the BSD engine 120, and the BSD component 122, to focus on discovering the correct systems of the business service. For example, a who user is interested in discovering a Jboss application server which includes an application named "pay" which has a servlet named "report" might use the following two hints: J2eeApplication="pay"; servlet="report". These two hints form a condition which is specific enough for the BSD component 122 to recognize the correct application server system in the context of the discovered business service structure, assuming that the containment relationships between J2eeApplication→J2eeModule→Servlet are not relevant for the correct identification of the application server system.

As noted above, the BSD component 122 produces an instance of its matching BSD class. Since the BSD class model is different from the uCMDB class model, it would be normally be impossible to report the instances of the BSD class model to the uCMDB. This is problematic when the discovered business service is to be stored in the uCMDB. In order to complete this storage function, each BSD component 122 creates a uCMDB graph that represents the system the BSD component 122 discovers. This allows the BSD engine 120 to create a complete representation of the business service expressed in terms of the uCMDB native class model. At the end of the business service discovery, the BSD engine 120 is able to report, and make available for display, the uCMDB graph representation of the business service to the uCMDB.

In general, a BSD component 122 is designed as an autonomous component which only requires an IP address and credentials for the complete discovery of its system.

When defining the business service structure, the user may add to the emerging structure one node after another. Each node matches to an appropriate BSD class. For each added node the user might attach a condition that will be used as a hint to allow the BSD engine 120 to determine at runtime whether an instance of a BSD class belongs to the business service. Each such instance will be returned by the appropriate BSD component 122, which will be activated by the BSD engine 120 to discover a system which might belong to the discovered business service. Only when the condition evaluates to true will the BSD engine 120 add the instance to the emerging uCMDB graph of instances. In the case that the condition evaluates to false, the instance is discarded as not being a part of the business service. Sometimes, the BSD engine 120 might accept an instance that initially evaluates to true. Subsequently, for example after a few additional steps, the BSD engine 120 might discard that same instance when, from a topological perspective (which is gained only after applying the few additional steps), the BSD engine 120 cannot make any progress to adjacent systems and hence performs a backtrack.

In general, the more specific hints the user can provide, the more accurate the result-set regarding the nodes of the discovered business service. When users do not provide enough hints, the discovery search may diverge, and this divergence might cause the BSD engine 120 to search too many systems. Systems are disqualified by the BSD engine 120 only because of backtracks (discussed below) and not because of conditions; otherwise the discovery search could be very inefficient and the returned result might include too many instances.

As noted above, the discovery search starts from the node with the most specific hints and conditions. The BSD engine 120 searches for the most specific hints attached to the nodes of the business service structure, looking first for hints such as IP addresses, DNS names, and URLs. Only when the BSD engine 120 does not find such hints does the BSD engine 120 search for more specific hints: e.g., class C subnet attached to one of the nodes.

After discovering the "current" node, the discovery search expands to each adjacent node by discovering each link connecting the discovered current node with each adjacent node. For example, consider link number 304 of the business service structure 300 of FIG. 3. Link number 304 connects node 303, which is the current node, with node 309. If the discovery of node number 303 has just finished successfully, the next discovery step may be discovering link number 304. The appropriate BSD component 122 is activated (the component reuses the process-to-process discovery pattern) to discover the TCP connections represented by link number 304. Upon completion, the BSD component 122 returns all link instances that match the condition attached to link number 304. The returned link instances represent TCP connections and include information regarding the IP address of the adjacent node, which is node number 309. The discovery search now can expand to discover node number 309 by activating the BSD component 122 that discovers the JBOSS application server. The BSD engine 120 chooses one of the link-304 returned instances and expands through that link to node number 309. The BSD engine 120 then attempts to expand, iteratively, to node number 309 through all the TCP connection instances returned for link number 304.

It is possible that not all the TCP connection instances returned for link 304 lead to a JBOSS process with the appropriate hint defined by node 309. In this case, the BSD engine 120 backtracks from the current instance candidate of node number 303 to the next candidate instance. The discovery search is reattempted through the new candidate instance and upon another failure the next candidate is attempted until either "search failure" or "search success with return" occurs.

For search failure, no more candidate instances are left for node number 303, which means that the search has failed since the user either provided an erroneous hint mistakenly linked two or more nodes that, in reality, are not connected. The reason of failure may be returned to the user (e.g., "Failed to discover node number 309").

However, the BSD engine 120 may be able to continue the search even when the search fails to expand through one of the links. For example, if the discovery search through link number 304 fails, the BSD engine 120 could continue the discovery search through link number 307. Eventually, the BSD engine 120 would return with all the nodes and links that were discovered successfully, as well as the nodes and links that were not discovered.

For search success and return, the discovery search through one of the candidate instances succeeds—in this case the BSD engine 120 continues to the next candidate instance and the search is reattempted through that instance. The BSD engine 120 may return all possible results to allow the user to choose the appropriate instances that belong to the required business service. If the number of possible results becomes too high, the discovery search may be halted.

Some business services might best be discovered using a parallel discovery search regime. More specifically, a business service might include a large number of systems and might span many departments or branches. In addition, some business processes are considered to be dynamic and might change occasionally. Thus, business services should be discovered within a reasonable time, and for this reason the discovery search of a business service may be enhanced by invoking a parallel discovery search.

The BSD engine 120 of FIG. 2 can support a parallel discovery search by selecting more then a single starting point if for the discovery search. To invoke this parallel search, the user provides specific hints/conditions for more then, and each such node then may be used as a starting point. For parallel search, each such starting point is given to a different thread that will drive the discovery search from that point. Whenever a thread "visits" a node that has unvisited links, the thread invokes additional threads, one thread per each sibling link. Each such thread discovers its link independently of the other threads (the threads may be taken from a pool if they are available).

Each concurrent thread expands the discovery search over the nodes and links of the business service structure. The discovery search expansion continues until the search becomes bounded, which occurs when all nodes adjacent to the thread expansion area have been visited by the other searching threads. In an embodiment, a limit may be imposed on the number of threads that concurrently discover the same business service.

Figure 4A:
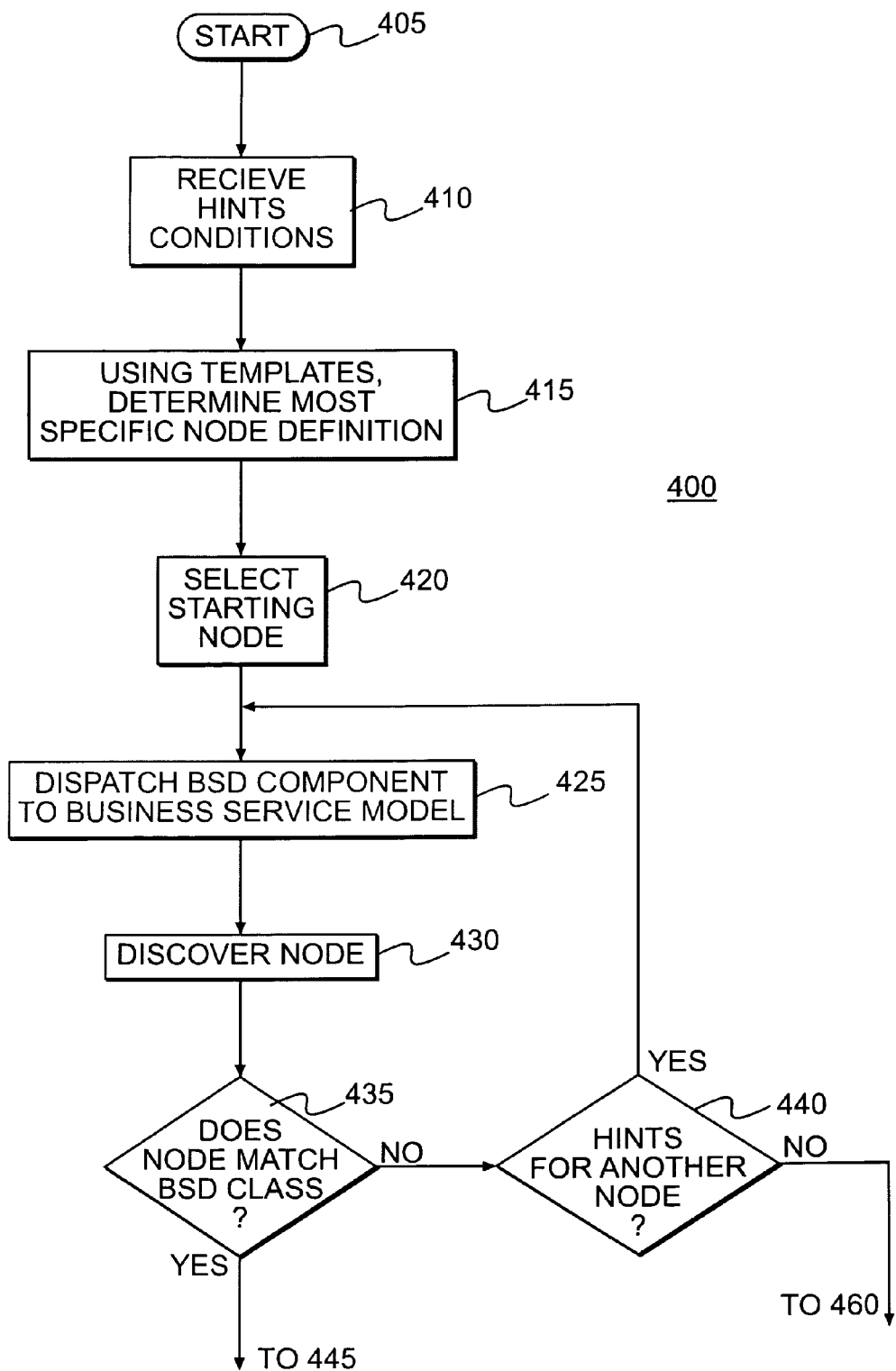
FIGS. 4A and 4B illustrate an exemplary operation of the system of FIG. 2.
Figure 4B:
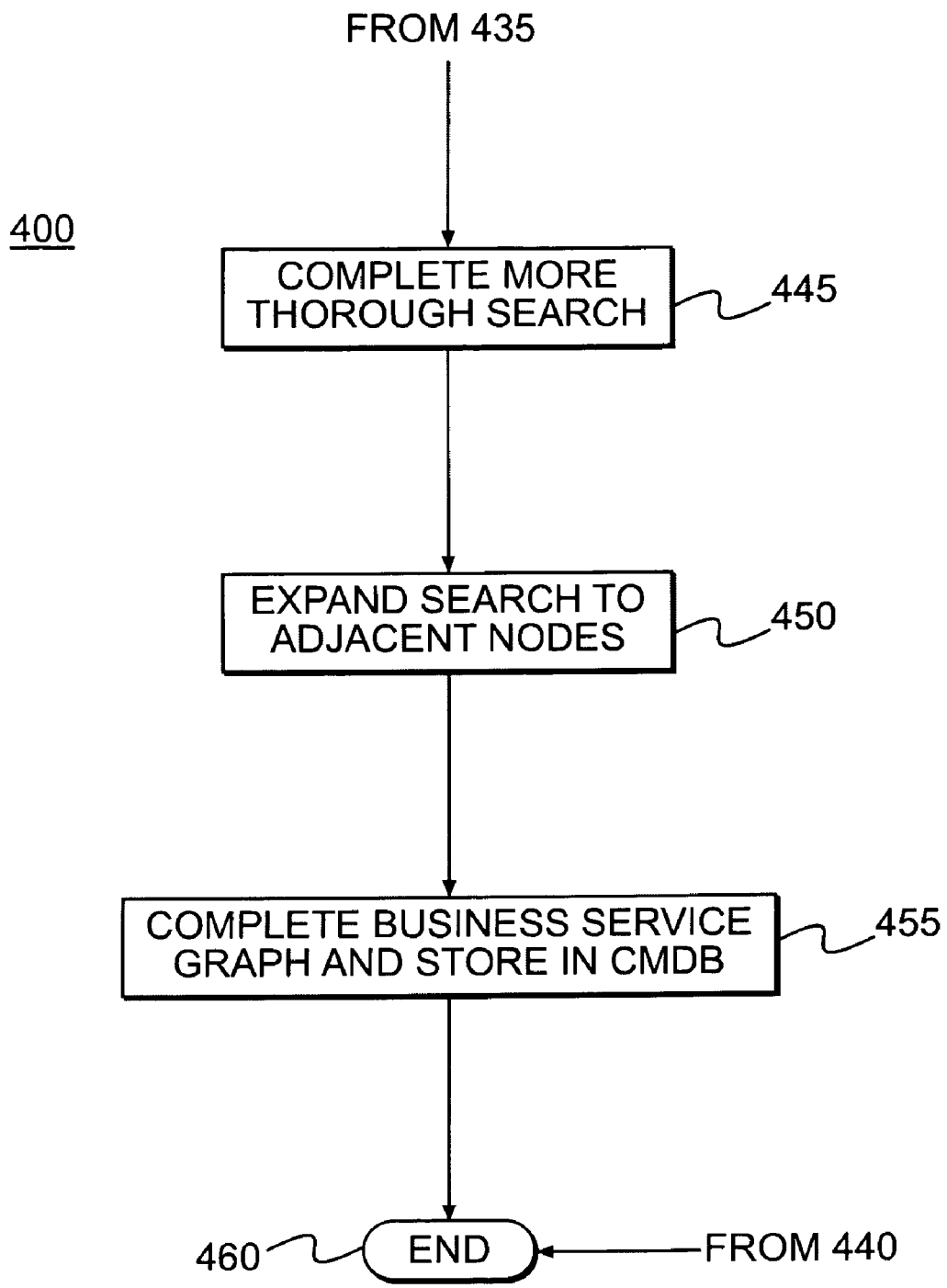

FIGS. 4A and 4B are a flowchart illustrating an exemplary discovery search 400 executed by the BSD engine 120 of FIG. 2. The discovery search 400 begins with block 405, with a user determining a specific business service of the organization to be "discovered." The selected business service may have in existence a more or less detailed structure, such as might be developed by an enterprise architect. However, this structure likely would not sufficiently identify the IT resources that allow the organization to provide the business service, and hence, a largely automated business service discovery search is conducted. As part of the operations encompassed by block 405, the user may note one or more nodes, elements, or systems, which support the business service. In block 410, the BSD engine 120 receives one or more hints or conditions for at least node in the business service. In block 415, if more than one node is used for designation of hints and conditions, then the BSD engine 120: 1) may determine, based on the BSD class definitions contained in the template module 140, for which node the received hints/conditions are most specific; and 2) if a parallel discovery search is to be conducted. In block 420, if a parallel discovery search is to be conducted, the discovery engine 120 will match the number of available threads to the number of nodes, and if the number of threads equals or exceeds the number of "starting nodes," will assign a thread to each such node. If the number of threads is less than the number of hinted nodes, the BSD engine 120 will select those nodes which have the most specific hints/conditions to be the starting nodes.

In block 425, the BSD engine 120 activates one or more BSD components 122 and dispatches the BSD components to conduct a discovery search commencing with the appropriate, designated starting node. In block 430, the BSD component "discovers" its designated node, meaning the BSD component compares the application signature appropriate for the nodes BSD class to the discovered application signature, and compares other available attribute data for the node to corresponding attribute data discovered at the node. In block 435, the BSD components, based on the comparison, determines if system supporting the node, as determined from attribute data discovered at the node, matches the BSD class. If the comparison results are negative (NO), the discovery search 400 proceeds to block 440, where the BSD component 122 informs the BSD engine 120 that a match does not exist, and where, in response, the BSD engine 120 determines if hints/conditions were provided for an alternative node. If additional hints/conditions were provided (YES in block 440), the discovery search 400 returns to block 425. Otherwise, the discovery search 400 proceeds to block 460 and ends.

In block 435, if the comparison shows a match, the discovery search proceeds to block 445 and a more thorough search of the node is completed. Also in this step, the BSD component may construct a graph, such as a uCMDB graph, for the system represented by the discovered node. The completed graph is returned to the BSD engine 120, where it is incorporated into an overall graph for the selected business service. Next, in block 450, after all or sufficient attribute data for the node has been discovered, the discovery search proceeds to block 450 and the discovery search expands to nodes adjacent to the originally-searched node.

In block 455, the various graphs generated by the BSD components are merged into a single graph (e.g., a uCMDB graph), and are stored in the uCMDB 150. In block 460, the discovery search ends.

The various disclosed embodiments for business service discovery may be implemented as a method, system, and/or apparatus. As one example, exemplary embodiments are implemented as one or more computer software programs to implement the methods described herein. The software is implemented as one or more modules (also referred to as code subroutines, or "objects" in object-oriented programming). The location of the software will differ for the various alternative embodiments. The software programming code, for example, is accessed by a processor or processors of the computer or server from a long-term storage media of some type, such as semiconductor, magnetic, and optical devices, including a removable disk or a hard drive. The code may be distributed on such media, or may be distributed to network operators from the memory or storage of one computer system over a network of some type to other computer systems for use by operators of such other systems. Alternatively, the programming code is embodied in the memory (such as memory of a handheld portable electronic device) and accessed by a processor using a bus. The techniques and methods for embodying software programming code in memory, on physical media, and/or distributing software code via networks are well known and will not be further discussed herein.

As a computer system, the business service discovery system may take the form of an entirely hardware embodiment, an entirely software embodiment (including firmware, resident software, micro-code, etc.) or an embodiment combining software and hardware aspects that may all generally be referred to herein as a "circuit," "module" or "system."

As a computer-readable medium, the business service discovery system may take the form of a computer program product on a computer-usable storage medium having computer-usable program code embodied in the medium. Any suitable computer usable or computer readable medium may be utilized. The computer-usable or computer-readable medium may be, for example but not limited to, an electronic, magnetic, optical, electromagnetic, or semiconductor system, apparatus, device, or medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device.

Computer program code for carrying out operations of the business service discovery system and method may be written in an object oriented programming language such as Java, Smalltalk, C++ or in conventional procedural programming languages, such as the C programming language or similar programming languages. The program code may execute entirely on one computer, on multiple computers, as a stand-alone software package, partly on a user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The business service discovery system and method have described with reference to flowchart illustrations and/or block diagrams of methods, apparatuses (systems) and computer program products. Each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a result, such that the instructions, which execute via the processor of the computer or other programmable data processing apparatus, create means for implementing the functions/acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The terms and descriptions used herein are set forth by way of illustration only and are not meant as limitations. Those skilled in the art will recognize that many variations are possible within the spirit and scope of the invention as defined in the following claims, and their equivalents, in which all terms are to be understood in their broadest possible sense unless otherwise indicated.

I claim:

1. A business service discovery (BSD) system comprising a processing resource in communication with a non-transitory computer-readable medium, wherein the computer-readable medium contains a set of instructions and wherein the processing resource is designed to carry out the set of instructions to discover, format, and store configuration information related to a business service, the system comprising:
   an input module capable of receiving hints and conditions related to nodes in the business service;
   a discovery engine, coupled to the input module, that receives the hints and conditions related to a physical computing object underlying the business service and creates a corresponding search methodology, wherein the discovery engine begins a discovery search by dispatching an appropriate discovery component to the physical computing object with the most specific hints or conditions;
   a template module coupled to the discovery engine, wherein the template module comprises search templates useable by the discovery engine to create the search methodology; and
   a plurality of discovery components that when activated by the discovery engine discover the physical computing object underlying the business service, wherein a discovery component comprises:
      a definition of a corresponding BSD class model,
      an application signature definition used to discover a specific instance of applications of the BSD class defined in the BSD class model, and
      a universal configuration management database (uCMDB) graph engine that creates a uCMDB graph representing a physical computing object discovered by the discovery component.

2. The system of claim 1, further comprising a uCMDB in which a business service structure is stored.

3. The system of claim 1, wherein the discovery engine determines which physical computing object of the business service is provided with the most specific hints or conditions.

4. The system of claim 3, wherein the discovery engine begins the discovery search at the physical computing object with the most specific hints or conditions.

5. The system of claim 1, wherein the discovery component discovers attribute data for the physical computing object with the most specific hints or conditions.

6. The system of claim 5, wherein the hints or conditions comprise Internet Protocol (IP) addresses, DNS names, and URLs.

7. The system of claim 6, wherein the BSD class model comprises BSD classes wherein each BSD class has a matching discovery component, and wherein the discovery component discovers a corresponding system and produces an instance of its matching BSD class.

8. The system of claim 6, wherein the discovery component receives the Internet Protocol (IP) address and credentials of a physical computing object to complete discovery of that physical computing object.

9. The system of claim 8, wherein the discovery component uses the application signature to determine if the IP hosts the system, and wherein if the IP does not host the system, the discovery component ends the discovery search.

10. The system of claim 8, wherein the discovery component, after discovering a first physical computing object, expands the discovery search to adjacent physical computing objects by discovering each link connecting the first physical computing object to each of the adjacent physical computing objects.

11. A method, implemented on a processor, for discovering and storing a business service structure, comprising:
   receiving hints or conditions for one or more physical computing objects of the business service structure and creating a corresponding search methodology, wherein search templates are used to create the search methodology;
   using the received hints or conditions, determining a physical computing object of the business service structure with the most specific hints or conditions;
   selecting a search component appropriate for the most explicitly defined physical computing object with the most specific hints or conditions and dispatching the search component to the physical computing object with the most specific hints or conditions to discover the physical computing object, wherein discovering the physical computing object comprises:
      applying an application signature definition to the physical computing object,
      determining if the Internet Protocol (IP) hosts the physical computing object, and
      determining links from the physical computing object to adjacent physical computing objects; generating a graph of the physical computing object;
   selecting an adjacent physical computing object and repeating the discovery process on the adjacent physical computing object; and continuing the adjacent physical computing object selection and discovery until all physical computing objects are discovered, wherein a graph of the business service structure is created.

12. The method of claim 11, further comprising storing the graph in a configuration management database.

13. The method of claim 11, wherein the hints or conditions comprise Internet Protocol (IP) addresses, DNS names, and URLs.

14. The method of claim 11, wherein the business service structure conforms to a business service discovery (BSD) model having a plurality of BSD classes, wherein each BSD class has a matching discovery component, and wherein the discovery component discovers a corresponding system and produces an instance of its matching BSD class.

15. A computer program product comprising code stored on a non-transitory computer readable medium, the code executable by a processor, the code when executed providing a method for discovering and storing a business service structure, comprising:

receiving hints or conditions for one or more physical computing objects of the business service structure and creating a corresponding search methodology, wherein search templates are used to create the search methodology;

using the received hints or conditions, determining a physical computing object of the business service structure with the most specific hints or conditions;

selecting a search component appropriate for the physical computing object with the most specific hints or conditions and dispatching the search component to the physical computing object with the most specific hints or conditions to discover the physical computing object, wherein discovering the physical computing object comprises:

applying an application signature definition to the physical computing object, determining if the Internet Protocol (IP) hosts the physical computing object, and determining links from the physical computing object to adjacent physical computing objects; generating a graph of the physical computing object;

selecting an adjacent physical computing object and repeating the discovery process on the adjacent physical computing object; and continuing the adjacent physical computing object selection and discovery until all physical computing objects are discovered, wherein a graph of the business service structure is created.

16. The method of claim 15, further comprising storing the graph in a configuration management database.

17. The method of claim 15, wherein the hints or conditions comprise Internet Protocol (IP) addresses, DNS names, and URLs.

18. The method of claim 15, wherein the business service structure conforms to a business service discovery (BSD) model having a plurality of BSD classes, wherein each BSD class has a matching discovery component, and wherein the discovery component discovers a corresponding system and produces an instance of its matching BSD class.

* * * * *

UNITED STATES PATENT AND TRADEMARK OFFICE
CERTIFICATE OF CORRECTION

PATENT NO. : 8,381,167 B2
APPLICATION NO. : 12/320587
DATED : February 19, 2013
INVENTOR(S) : Emil Shmul It is certified that error appears in the above-identified patent and that said Letters Patent is hereby corrected as shown below:

In the Claims

In column 14, lines 50-51, in Claim 11, after "the" delete "most explicitly defined".

Signed and Sealed this
Eighteenth Day of June, 2013

Teresa Stanek Rea
*Acting Director of the United States Patent and Trademark Office*